(12) United States Patent
Roelofsen et al.

(10) Patent No.: US 7,162,031 B1
(45) Date of Patent: Jan. 9, 2007

(54) METHOD AND DEVICE FOR CRYPTOGRAPHICALLY PROCESSING DATA

(75) Inventors: Gerrit Roelofsen, Leiden (NL); Dirk Jan Jacobus Van Bruchem, Wateringen (NL); Frank Muller, Delft (NL); Willem Rombaut, The Hague (NL)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/787,648

(22) PCT Filed: Dec. 16, 1999

(86) PCT No.: PCT/EP99/10208

§ 371 (c)(1),
(2), (4) Date: Mar. 20, 2001

(87) PCT Pub. No.: WO00/41356

PCT Pub. Date: Jul. 13, 2000

(30) Foreign Application Priority Data

Dec. 30, 1998 (NL) .................................. 1010921
Mar. 12, 1999 (NL) .................................. 1011544
Apr. 15, 1999 (NL) .................................. 1011800

(51) Int. Cl.
  *H04K 1/00* (2006.01)
  *H04L 9/00* (2006.01)
  *H04L 9/28* (2006.01)
(52) U.S. Cl. ............................. 380/28; 380/277
(58) Field of Classification Search ............ 380/28, 380/29, 37; 370/202
See application file for complete search history.

(56) References Cited

U.S. PATENT DOCUMENTS

| | | | | |
|---|---|---|---|---|
| 4,302,810 A | * | 11/1981 | Bouricius et al. | 705/75 |
| 5,003,596 A | * | 3/1991 | Wood | 380/28 |
| 5,442,705 A | * | 8/1995 | Miyano | 380/29 |
| 5,724,428 A | * | 3/1998 | Rivest | 380/37 |
| 5,745,577 A | * | 4/1998 | Leech | 380/28 |
| 5,768,390 A | * | 6/1998 | Coppersmith et al. | 380/42 |
| 6,028,933 A | * | 2/2000 | Heer et al. | 713/169 |

FOREIGN PATENT DOCUMENTS

| EP | 0 896 452 | | 2/1999 |
|---|---|---|---|
| EP | 0896452 A2 | * | 10/1999 |

OTHER PUBLICATIONS

B. Schneier, Chapter 15—Combining Block Ciphers (Applied Cryptography□□- 2nd Edition, (* 1996, Pub. by John Wiley & Sons, Inc.) pp. 363, 366-367.*

(Continued)

*Primary Examiner*—Gilberto Barrón, Jr.
*Assistant Examiner*—Kristin D. Sandoval
(74) *Attorney, Agent, or Firm*—Michaelson & Associates; Peter L. Michaelson

(57) ABSTRACT

For cryptographically processing data, data (X) and a key (K) are fed to a cryptographic process (P), which may be a known process. In order to veil the nature of the process (P), auxiliary values as fed to the process, such as a supplementary key (K*), using which a supplementary process (P*) generates the key proper (K). The combination of the original process (P) and the supplementary process (P*) provides an unknown process, hence, the relationship between the supplementary key (K*) and the processed data (Y) is unknown. As a result, improved cryptographic security results.

34 Claims, 7 Drawing Sheets

OTHER PUBLICATIONS

A. Biham et al, "How To Strengthen DES Using Existing Hardware", Advances in Cryptology—Asiacrypt '94, 4th International Conference on the Theory and Applications of Cryptology, Wollongong, Australia, Nov. 28-Dec. 1, 1994, Proceedings, pp. 398-412.

B. Schneier, "Chapter 12—Data Encryption Standard (DES)", Applied Cryptography—2nd Edition, (© 1996, Pub. by John Wiley & Sons, Inc.) pp. 265-300.

B. Schneier, "Chapter 19—Public-Key Algorithms", Applied Cryptography—2nd Edition, (© 1996, Pub. by John Wiley & Sons, Inc.) pp. 466-474.

* cited by examiner

METHOD AND DEVICE FOR CRYPTOGRAPHICALLY PROCESSING DATA

BACKGROUND OF THE INVENTION

The invention relates to a method for cryptographically processing data, comprising feeding, to a cryptographic process, values, namely, the data and a key, and carrying out the process in order to form cryptographically processed data. Such method is generally known.

For cryptographically processing data, in practice there are often applied generally known processes. Examples of such cryptographic processes (algorithms) are DES and RSA [DES=Data Encryption Standard and RSA=Rivest, Shamir & Adleman], which are described, e.g., in the book "Applied Cryptography" by B. Schneier (2nd edition), New York, 1996.

Said processes are published since it was assumed that, in the event of sufficiently large key lengths, it would be impossible, on the basis of the processed data, to retrieve the original data and/or the key, even if the cryptographic process were known.

However, Cryptographic algorithms can be attacked—the goal always is to find the encryption key in use—in different ways: (1) Mathematical attacks like differential and linear cryptanalysis; (2) Hardware oriented attacks, called "Side Channel Attacks", viz. attacks based on power consumption analysis or I/O timing analysis.

U.S. Pat. No. 5,745,577 discloses a method for advanced key scheduling of a secret key. The aim is to offer a protection against said mathematical attacks (differential and linear cryptanalysis) by mending the encryption algorithm. Amending the algorithm will cause change of its output and thus the disclosed method does not present any improvement against said "Side Channel Attacks".

SUMMARY OF THE INVENTION

The present invention aims to improve the protection of a cryptographic device against "Side Channel Attacks". In short, said improvement is achieved by masking the data and/or the key by means of generating extra, auxiliary input (data or key) and compensating its influence to the output by adding, to the "main" encryption process, an auxiliary (compensating) process. By said masking measures it will be much more difficult to derive the value of data or key from the behavior of the power consumption of the cryptographic device. Said masking, however, happens in such a way that the result of the process as a whole remains unchanged: with the same input and key the amended algorithm results into the same, unchanged output.

Thus the invention presents a method of the type referred to in the preamble according to the invention which is characterized by feeding, to the process, auxiliary values, while compensating, by means of an auxiliary process, the influence of the auxiliary values to the output data, in order to mask the values used in the process.

By masking the date and/or key(s) it becomes considerably more difficult to derive said values on the basis of the behavior of the process. The result of the process, i.e., the collection of processed data, in the event of a suitable choice of the auxiliary values may be unchanged, i.e., identical to the result of the process, if no auxiliary values have been fed to it. In this connection, an "auxiliary value" is understood to mean a value (data or key) which is fed to the process as a supplement to the corresponding data and key.

The invention is therefore based on the insight that the derivation of the values used in a cryptographic process is rendered considerably more difficult if said values are masked using said auxiliary values and said auxiliary process.

The invention is partly based on the further insight that the use of auxiliary values does not necessarily affect the outcome of the process.

In a first embodiment of the invention, an auxiliary value comprises a supplementary key which is fed to a supplementary process in order to form the key.

By applying a combination of a known process and a supplementary process, there is formed a new cryptographic process, unknown per se, even if the supplementary process is also known per se.

By deriving the key used for the known process (primary key) from a supplementary key (secondary key) using a supplementary process, there is achieved that not the (primary) key of the known process but the supplementary (secondary) key is offered to the combination of processes. In other words, externally the supplementary (secondary) key, and not the real (primary) key of the process proper, is used. Derivation of the key from the original data and the processed data has thereby become impossible. In addition, the derivation of the supplementary key has been rendered seriously more difficult, since the combination of the original process and the supplementary process is not known.

Said embodiment of the invention is therefore based, inter alia, on the insight that prior knowledge of a cryptographic process is undesirable, such is contrary to what was so far assumed. Said embodiment is also based on the Further insight that attacks which elaborate on knowledge of the process become considerably more difficult if the process is unknown.

The supplementary process preferably comprises a cryptographic process. This renders the derivation of the supplementary key more difficult. Basically, however, a simple encoding may be applied, e.g., as a supplementary process. In the event of a cryptographic process, there is preferably applied an auxiliary key.

The supplementary process advantageously is an invertible process. This enables the application of the method according to the invention in existing equipment with minimum modifications. If, e.g., a first device gives off a (supplementary) key which is applied in a second device according to the invention, then in the first device there may be used the inverse of the supplementary process to derive the supplementary key from the original key. In other words, although in both the first and the second device internally the original (primary) key is used, there is exchanged, between the devices, the supplementary (secondary) key. Intercepting the supplementary key, however, does not result in knowledge of the original key.

It may be advantageous if carrying out the supplementary process takes place exclusively if the data has predetermined properties. In this manner, cryptographic processing may be carried out for specific, selected data only, while such is blocked for all other data. In this manner, there is achieved a supplementary protection.

An optimum security is provided if the process and the supplementary process are each constructed of several steps and in which there are alternately carried out steps of the process and the supplementary process. As a result, the properties of the known process are further veiled, as a result of which the derivation of the keys is further complicated.

In a second embodiment of the invention, the process comprises several steps, each of which has a cryptographic operation for processing right-hand data derived from the data and a combinatory operation for combining, with the left-hand data derived from the data, the processed right-hand data in order to form modified left-hand data, in which the right-hand data, prior to the first step, is combined with a primary auxiliary value and the left-hand data is combined with an additional auxiliary value. As a result, the data used in the steps and transferred between the steps is masked.

In order to make it possible for the primary and additional auxiliary values do not make themselves felt in the end result of the process, the right-hand data is combined, preferably immediately after the last step, with a further primary auxiliary value, and the modified left-hand data is combined with a further additional auxiliary value.

In order not to have the result of the operations affected by the primary auxiliary values, the method according to the invention is preferably carried out in such a manner that the right-hand data, in each step and prior to the operation, is combined with the primary auxiliary value of said step. A further protection is achieved if the processed right-hand data, following the processing, is combined with a secondary auxiliary value of said step.

The secondary auxiliary value of a step is advantageously formed from the combination of the primary auxiliary value of the preceding step and the primary auxiliary value of the next step.

As a result, it becomes possible to compensate the auxiliary value in the repeatedly next step, as a result of which said auxiliary value will not make itself felt in the end result of the process.

It is possible to carry out the method according to the invention in such a manner, that all primary auxiliary values are equal. As a result, a very simple practical realization is possible. The use of several auxiliary values, which are preferably random numbers and are generated anew for each time the process is carried out, however, offers a greater cryptographic security.

A further simplification of said embodiment may be obtained if the primary auxiliary values and/or secondary auxiliary values repeatedly have been combined in advance with the operation in question. This is to say, combining with auxiliary values is processed in the operation in question (e.g., a substitution), in such a manner that the result of the operation in question is equal to that of the original operation plus one or two combinatory operations with auxiliary values. By in advance including in the operation the combinatory operations, a more simple and faster practical realization is possible.

Said combinatory operations are preferably carried out using an XOR operation [XOR=exclusive OR]. Other combinatory operations, however, such as binary adding, are basically possible as well.

The invention further provides a circuit for carrying out a method for cryptographically processing data. In addition, the invention supplies a payment card and a payment terminal provided with such circuit.

Below, the invention will be further explained on the basis of the exemplary embodiments shown in the figures.

PREFERRED EMBODIMENTS

Figure 1:
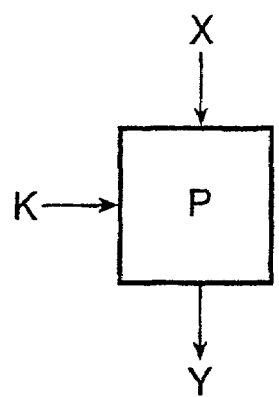
FIG. 1 schematically shows a cryptographic process according to the prior art.

A (cryptographic) process P according to the prior art is schematically shown in FIG. 1. To the process P, there are fed input data X and a key K. On the basis of the key K, the process P converts the input data X into (cryptographically) processed output data Y: Y=PK(X). The process P may be a known cryptographic process, such as DES (Data Encryption Standard), triple DES, or RSA (Rivest, Shamir & Adleman).

If the input data X and the output data Y are known, it is basically possible to derive the key K used. In the event of a key of sufficient length (i.e., a sufficient number of bits), it was so far deemed impossible to derive said key, even if the process P were known. Impossible in this case is to say that in theory it is admittedly possible, e.g., by trying out all possible keys, to retrieve the key used, but that such requires an impossibly long computational time. Such "brute-force attack" is therefore hardly a threat to the cryptographic security.

Attacks recently discovered, however, make use of knowledge of the process, as a result of which the number of possible keys may be reduced drastically. Deriving the key K used and/or the input data X from the output data Y therefore becomes possible within acceptable computational times.

Figure 2:
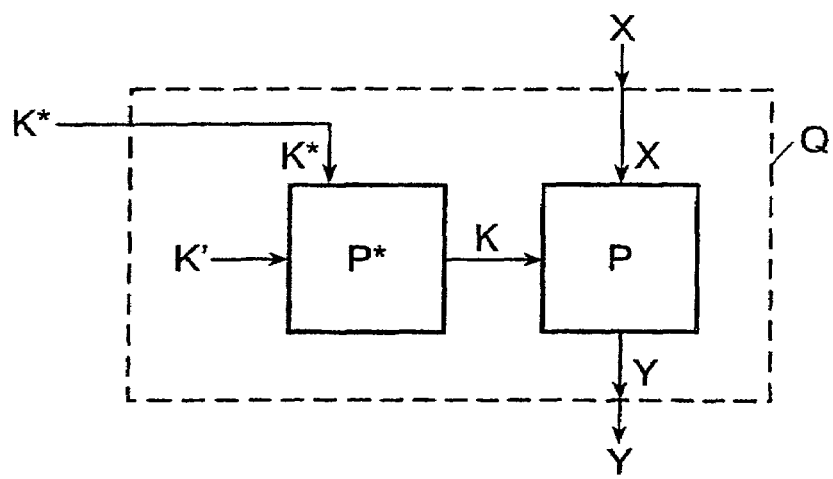
FIG. 2 schematically shows a first cryptographic process according to a first embodiment of the invention.

The principle of the invention, whose object it is to render such attacks considerably more difficult and time-consuming, is schematically shown in FIG. 2. Just as in FIG. 1, to a (known) process P there are fed input data X and a (secret) key K to generate output data Y.

Contrary to the situation of FIG. 1, in the situation of FIG. 2 the key K is fed to the process P from a supplementary process P*. The supplementary process P* has a supplementary (secondary) key K* as input data to produce, under the influence of an auxiliary key K', the (primary) key K as output data. The key K is therefore not fed, as is the case in the situation of FIG. 1, from an external source (e.g., a memory) to the process P, but is produced by the process P* from the supplementary (secondary) key K*:

$K = P^*_{K'}(K^*)$.

It is therefore the secondary key K*, instead of the primary key K, which is predetermined and stored, e.g., in a key memory (not shown). According to the invention, the primary key K, which is fed to the process P, is not predetermined.

The auxiliary key K' may be a permanently stored, predetermined key. It is also possible to apply a supplementary process P* in which no auxiliary key K' is used.

The combination of the processes P and P* forms a new process which is schematically designated by Q. To the process Q which, on account of the supplementary process P*, is unknown per se, the input data X and the (secondary) key K* are fed to produce the output data Y. The relationship between the secondary key K* and the primary key K is veiled by the supplementary process P*.

The supplementary process P* preferably is the inverse of another, invertible process R. This is to say:

$$P^* = R^{-1}$$

This enables producing the secondary key K* from the primary key K using R and the auxiliary key K':

$$K^* = R_{K'}(K)$$

as will be further explained later by reference to FIG. 5. The new process Q may possibly be extended by the process R, in such a manner that the primary key K, instead of the secondary key K*, is fed to the process Q. The primary key K in this case in the process Q is derived from:

$$K = P^*_{K'}(K^*) = P^*_{K'}(R_{K'}(K))$$

This enables using the same (primary) key as in the prior art.

Figure 3:
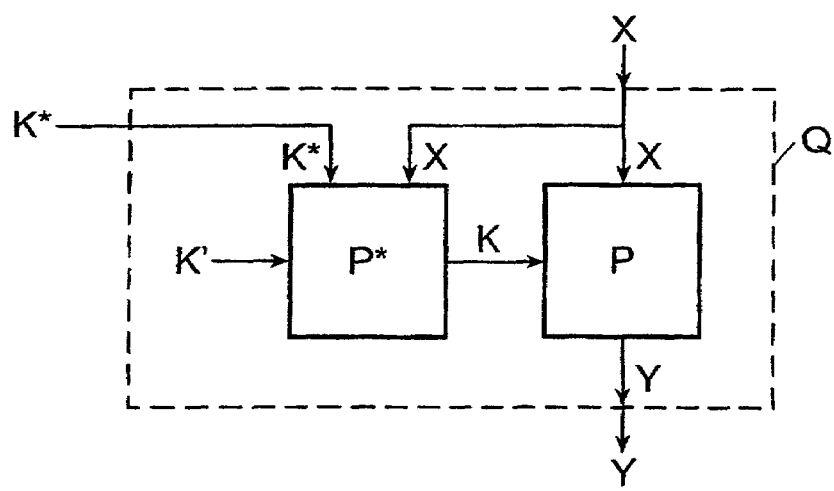
FIG. 3 schematically shows a second cryptographic process according to a first embodiment of the invention.

The cryptographic process Q according to the invention, schematically shown in FIG. 3, also comprises a process P having a primary key K and a supplementary process P* having an auxiliary key K', the primary key K being derived from the supplementary key K* by the supplementary process P*. Supplementing the process of FIG. 1, in this case the input data X is also fed to the supplementary process P*, in such a manner that the primary key K is determined partly as a function of the input data X:

$$K = P^*_{K'}(K^*, X)$$

As a result, there is obtained a supplementary cryptographic protection. In addition, as a result the possibility is offered to carry out the supplementary process P* exclusively if certain input data is offered. This is to say that the supplementary process P* may comprise a test of the input data X, and carrying out the supplementary process P* may depend on the result of said test. Thus, the supplementary process P*, e.g., may be carried out only if the last two bits of the input data X equal zero. The effect of such an input data-dependent operation is that only for certain input data X the correct primary key K will be produced in such a manner that only said input data will deliver the desired output data Y. It will be understood that as a result the cryptographic security is further enhanced.

Figure 4:
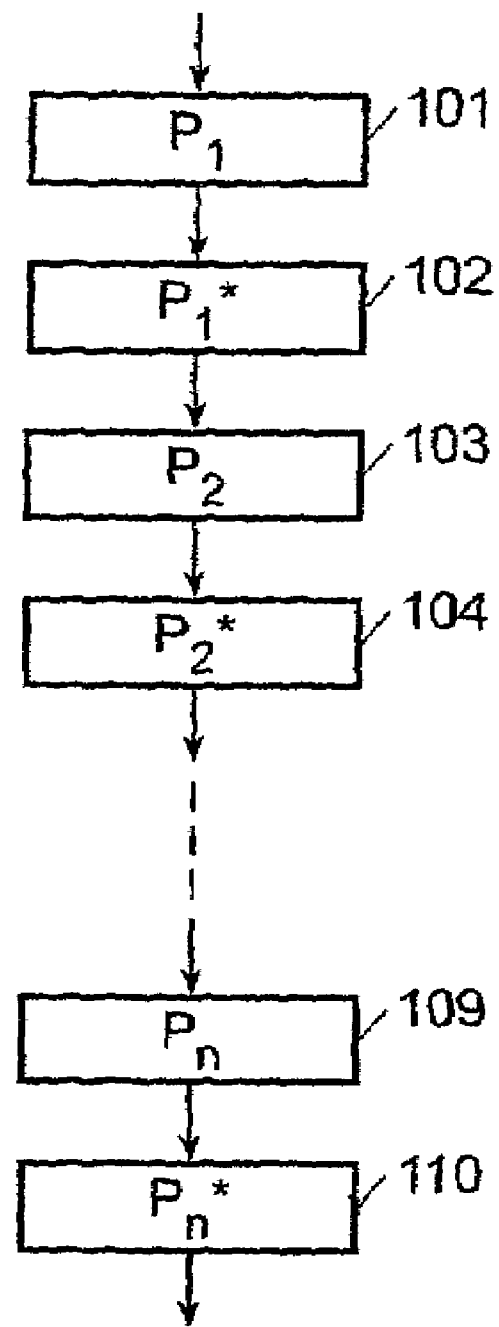
FIG. 4 schematically shows a way in which the processes of figures FIGS. 1 and 2 may be carried out.

FIG. 4 schematically shows the way in which substeps of the processes P and P* may be carried out alternatingly ("interleaving") in order to further enhance the protection against attacks. The substeps may include so-called "rounds", such as, e.g., in the case of DES. The substeps, however, preferably comprise only one or a few instructions of a program, with which the processes are being carried out.

In a first step 101, there is carried out a first substep $P_1$ of the process P. Subsequently, in a second step 102, the first substep $P_1^*$ of the supplementary process P* is carried out.

Likewise, in a third step 103, the second substep P2 of the process P is carried out etc. This continues until, in step 110, the last substep $P_n^*$ of the supplementary process P* has been carried out, it being assumed, for the sake of the example, that the processes P and P* comprise an equal number of substeps. If such is not the case, in step 110 there is carried out the last corresponding substep, and in further steps the remaining substeps are carried out.

By alternating the substeps of the process P, which is known per se, and the process P* (possibly known per se as well), there may be obtained a series of substeps which does not correspond to that of a known process. As a result, the nature of the process is more difficult to recognize.

Figure 5:
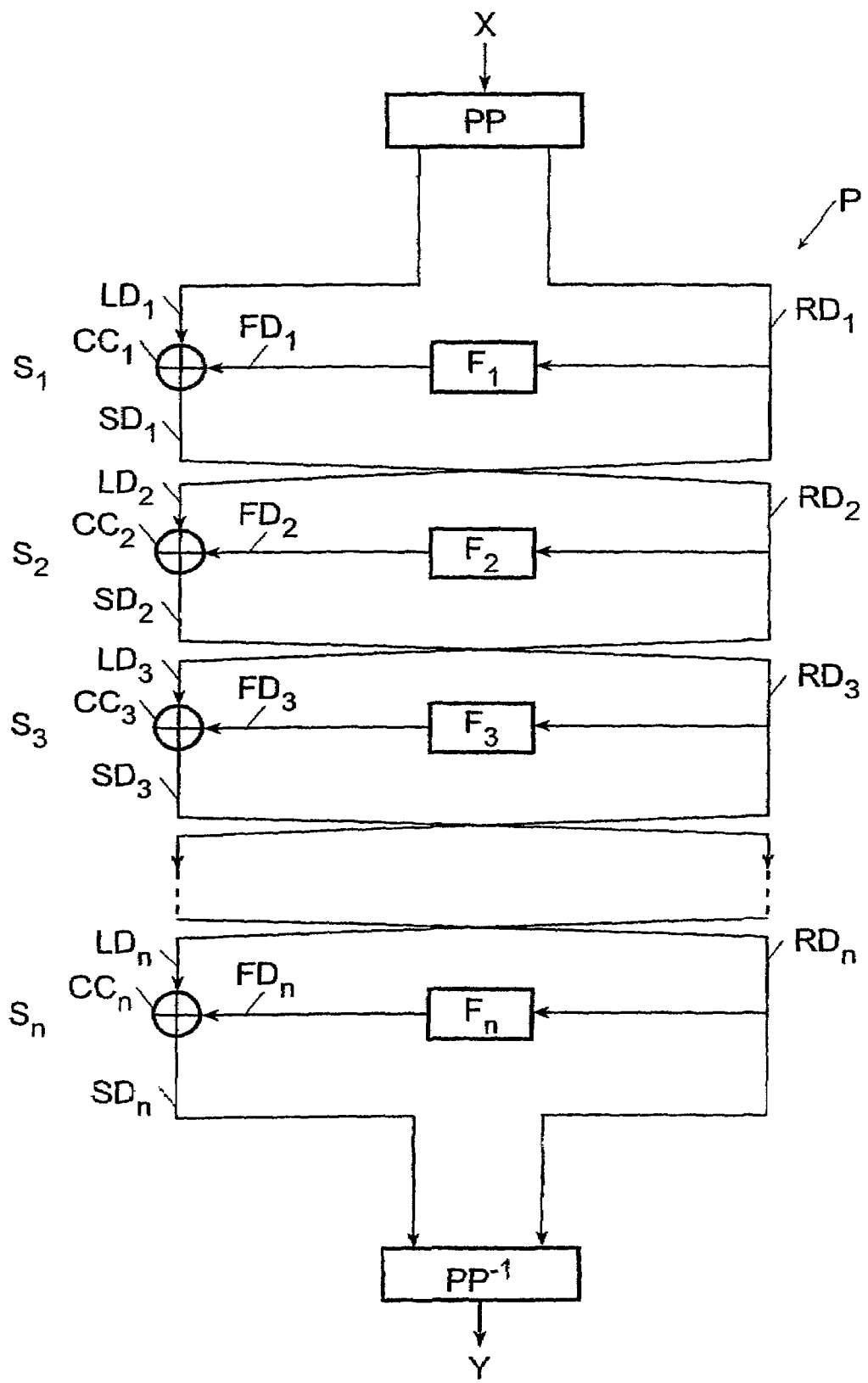
FIG. 5 schematically shows a cryptographic process having several steps according to the prior art.

The cryptographic process P schematically shown, only by way of example, in FIG. 5, according to the prior art comprises several steps $S_i$ (i.e., $S_1, S_2, \ldots, S_n$). In each step $S_i$, (right-hand) data $RD_i$ is fed to a cryptographic operation $F_i$. Said cryptographic operation may itself comprise a number of substeps, such as an expansion, a combination with a key, a substitution and a permutation which, however, have not been designated separately for the sake of the simplicity of the drawing. The cryptographic operation $F_i$ provides processed data $FD_i$:

$$FD_i = F_i(RD_i).$$

In a combinatory operation $CC_i$ ($CC_1$, $CC_2$, ..., the index i always indicating the step S in question), the processed data $FD_i$ is combined with left-hand data $LD_i$ to form modified (left-hand) data $SD_i$ which, just as the original right-hand data RD, is passed on to the next step. The combinatory operations $CC_i$ preferably are XOR operations (symbol: $\oplus$).

As is shown in FIG. 5, at the end of each step $S_i$ the modified left-hand data $SD_i$ and the right-hand data $RD_i$ change positions in such a manner that they form the right-hand data $RD_{i+1}$ and the left-hand data $LD_{i+1}$ of the next step $S_{i+1}$.

The left-hand data $LD_1$ and the right-hand data $RD_1$ of the first step $S_1$ were derived, in a preceding operation, from input data X and, in doing so, may undergo a preparatory processing, such as an input permutation. The output data $SD_n$ and $RD_n$ of the last step $S_n$ form the processed data Y of the process P, possibly after it has undergone a final operation, such as an output permutation $PP^{-1}$.

Figure 6:
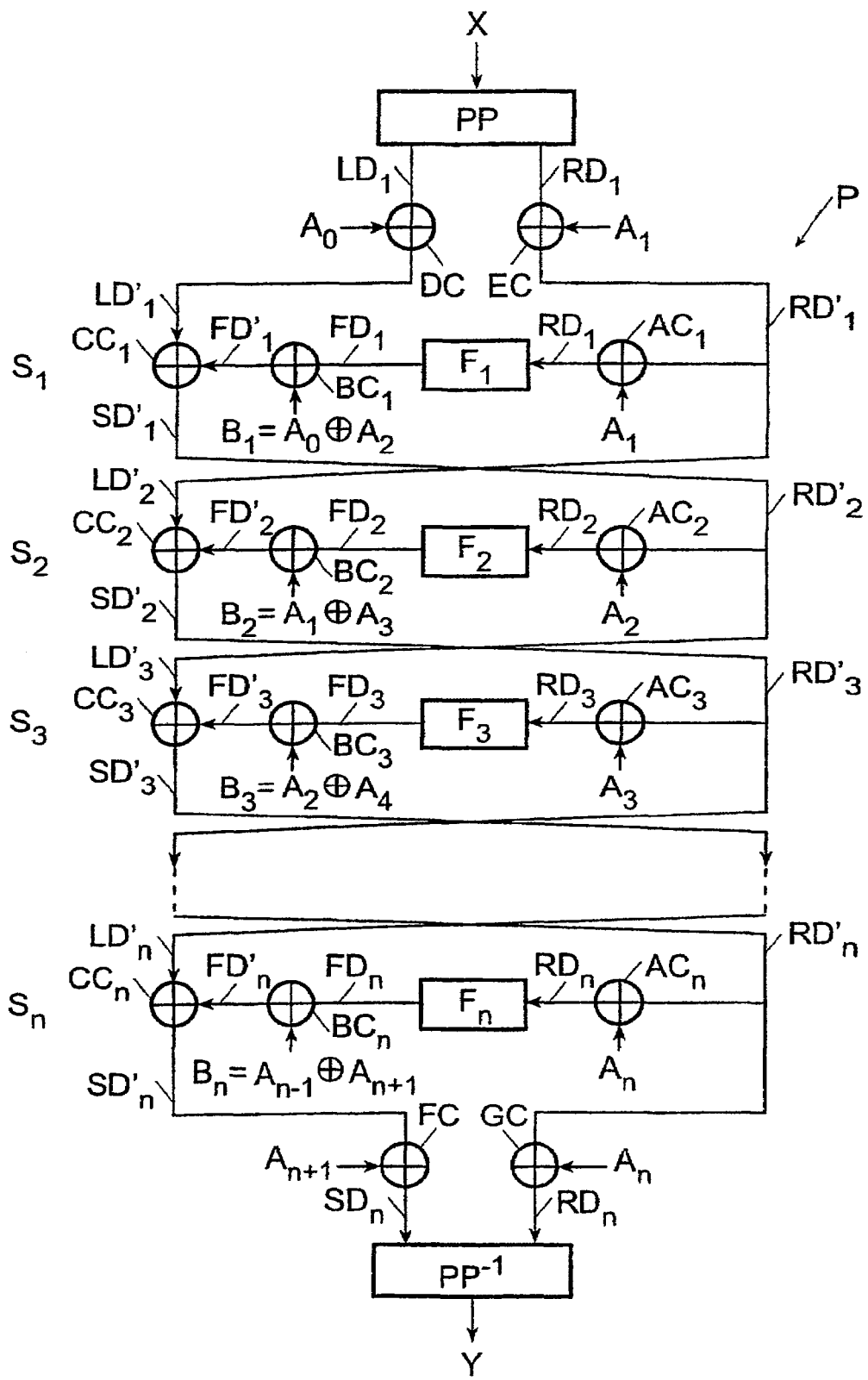
FIG. 6 schematically shows a first cryptographic process according to a second embodiment of the invention.

The cryptographic process of FIG. 6 largely corresponds to that of FIG. 5. In accordance with the invention, the data present in and between the steps is masked with auxiliary values. For this purpose, in this embodiment the first step $S_1$ is preceded by (preparatory) combinatory operations DC and EC, which are preferably XOR operations as well. They combine the left-hand data $LD_1$, and the right-hand data $RD_1$, respectively, which originate from the preparatory operation (PP), with a zeroth auxiliary value $A_0$ and a first auxiliary value $A_1$. The results of the combinatory operations DC and EC are left-hand masked data $LD'_1$ and right-hand masked data $RD'_1$, respectively (in the continuation of this text, masked data will be designated by an apostrophe). The maskings make themselves felt in the subsequent steps. Since the left-hand data of the second step $S_2$ is equal to the masked right-hand data of the first step $S_i$, said left-hand data $LD'_2$ is masked as well. The right-hand data $RD'_2$ of the second step is masked since it is equal to the masked, modified data $SD_1'$.

Combining the data $LD_i$ and $RD_i$ with the auxiliary values $A_i$ therefore results in the modified data $LD_i'$ and $RD_i'$ being masked, as a result of which it is considerably more difficult to derive the original data X or the key used from the masked data $LD_i'$ and $RD_i'$.

In order to remove the auxiliary values Ai prior to the final operation ($PP^{-1}$), there are provided completing combinatory operations FC and GC, which combine the modified and masked left-hand data $SD'_n$ of the last step $S_n$ with an auxiliary value $A_{n+1}$ and the masked right-hand data $RD'_n$ with an auxiliary value $A_n$, respectively. On account of Ai $\oplus$ Ai being zero in this manner the maskings are removed by the auxiliary values Ai. As a result, it is possible to carry out the method in such a manner that, notwithstanding the use of the auxiliary values $A_i$, the final data Y is equal to that which would have been obtained by the conventional method according to FIG. 5.

In order to exclude the effect of the auxiliary values Ai on the results $FD_i$ of the operations $F_i$, in each step $S_i$ there is preferably present a supplementary combinatory operation $AC_i$ which combines the right-hand data $RD_i$ with a (primary) auxiliary value $A_i$ before this data is fed to the cryptographic operation $F_i$. The result of each supplementary combinatory operation $AC_i$ is non-masked right-hand data $RD_i$, so that the cryptographic operation $F_i$ works on the same data as in the process of FIG. 5.

There may be advantageously inserted a further combinatory operation $BC_i$ between the cryptographic operation $F_i$ and the combinatory operation $CC_i$ with the purpose of combining the processed (right-hand) data $FD_i$ with a further (secondary) auxiliary value $B_i$. As a result, there may be achieved a masking of the processed data $FD_i$ and a further masking of the (modified) left-hand data $SD'_i$. The combinatory operations $AC_i$ and $BC_i$ preferably are XOR operations as well.

In accordance with a further aspect of the invention, the auxiliary values Ai and Bi are related. The secondary auxiliary values Bi are formed, preferably using an XOR operation, from the first auxiliary value $A_{i-1}$ of the previous step and the auxiliary value $A_{i+1}$ of the next step:

$$B_i = A_{i-1} \oplus A_{i+1}$$

This results in each primary auxiliary value $A_{i+1}$ which, using a further supplementary combinatory operation $BC_i$, is combined with the processed right-hand data $FD_i$ as an ingredient of the secondary auxiliary value $B_i$, repeatedly being compensated in the next step, i.e., step $S_{i+1}$, by means of a combinatory operation $AC_i$ before the right-hand data $RD_{i+1}$ is subjected to the operation $F_i$. The (masked) right-hand data $RD'_i$ in question, which forms the (masked) left-hand data $LD'_{i+1}$ of the still next step $S_{i+2}$ are combined there with the primary auxiliary value $A_{i+1}$ and is compensated in this manner. The auxiliary value $A_{i+1}$ makes itself felt in the modified data $SD'_i$, in such a manner that this remains masked between two steps.

The left-hand data $LD'_1$ of the first step $S_1$ is masked with the additional or zeroth (primary) auxiliary value $A_0$. By combining, with the secondary auxiliary value $B_1 = A_0 \oplus A_2$, the initial auxiliary value $A_0$ is removed (on account of $A_0 \oplus A_0$ being zero), but the auxiliary value $A_2$ and the masking achieved therewith are maintained. The zeroth auxiliary value $A_0$ in this embodiment is preferably chosen equal to the first auxiliary value $A_1$.

Although all primary auxiliary values $A_i$ are preferably chosen to be different, with the exception of $A_0 = A_1$, it is possible to choose all primary auxiliary values $A_i$ to be equal. In this case, all secondary auxiliary values $B_i$ in the embodiment shown will be equal to zero, so that the further combinatory operations $BC_i$ may be omitted. The invention further applies to processes P which contain only one step S, or have a deviating structure.

Figure 7:
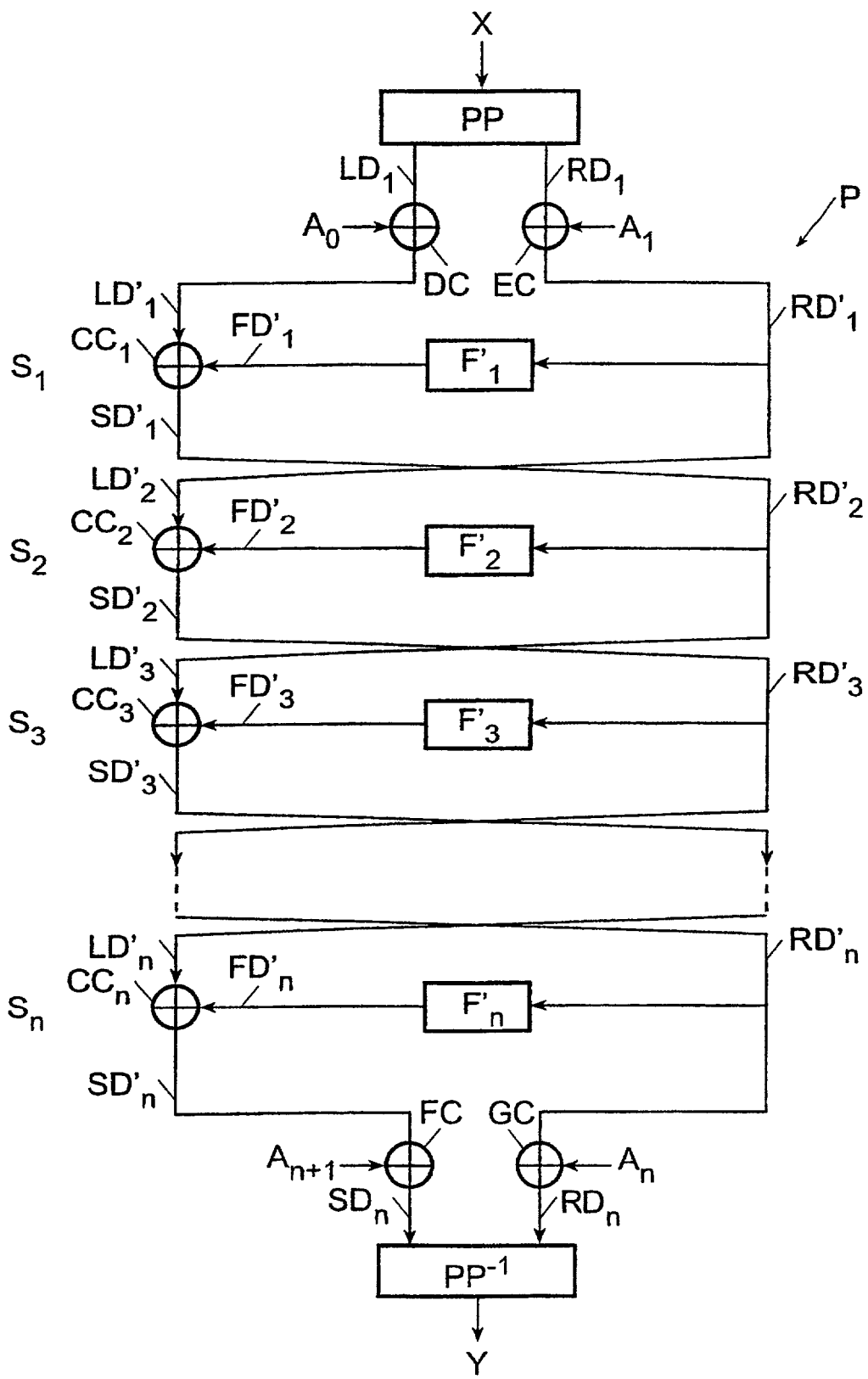
FIG. 7 schematically shows a second cryptographic process according to a second embodiment of the invention.

In the process of FIG. 7, which largely corresponds to that of FIG. 6, the combinatory operations $AC_i$ and $BC_i$ and the cryptographic operation $F_i$ in each step are integrated to form a combined operation $F'_i$. Integrating the combinatory operations in the operations $F_i$ is possible by suitably adjusting, e.g., a substitution table of the operation $F_i$. As a result, the supplementary combinatory operations $AC_i$ and $BC_i$ may be omitted and the result of the adjusted operation $F'_i$ is equal to the result of the total of the operation $F_i$ proper and the combinatory operations:

$$FD'_i = F'_i(RD'_i) = B_i \oplus F_i(A_i \oplus RD'_i)$$

Basically, each step $S_i$ requires a different combinatory operation $F_i$ in which various auxiliary values $A_i$ are integrated (see FIG. 6). Only if the auxiliary values Ai are chosen equal, i.e., $A1 = A2 = \ldots = A_n$, the combinatory operations $F_i$ in this embodiment may be equal.

Each time the process is carried out, the values $A_i$ are preferably chosen anew. For the process of FIG. 7, this means that the combined operations $F'_i$ are then determined anew. Since the operations $F'_i$ in many implementations will comprise the use of several tables, such as substitution tables, said tables will be determined anew each time the process P is carried out. In order to offer a supplementary protection against attacks, according to a further aspect of the invention the tables will be determined in random order. If a combined operation $F'_i$ comprises, e.g., eight tables, said eight tables will be determined in another order each time said operation $F'_i$ is carried out a new. Said order may be determined on the basis of the contents of an order register, which contents may each time be formed by a random number originating from a random-number generator. On the basis of the contents of the order register there may each time be composed a fresh lookup table. Using the lookup table, the tables may be written to a memory and later be read out.

According to a further aspect of the invention, supplementing this or instead thereof, the elements of each table may be determined and/or stored in random order. With this measure it is achieved that the protection against attacks is also improved. In this case, too, there may be applied a lookup table on the basis of which the elements may later be retrieved.

Figure 8:
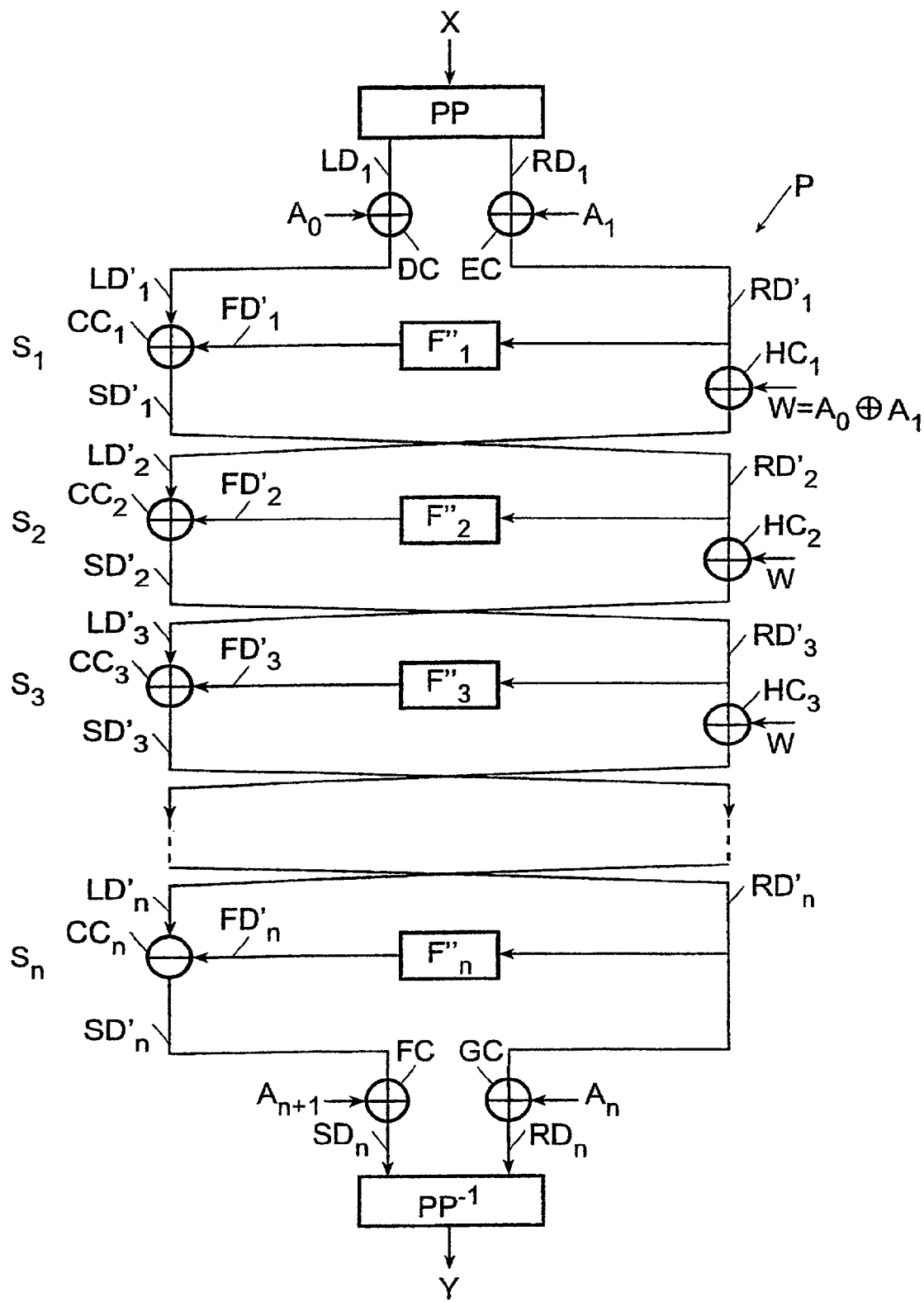
FIG. 8 schematically shows a third cryptographic process according to a second embodiment of the invention.

The measures referred to above may also be applied in another embodiment of the invention, such as the one of FIG. 8, or in completely different other processes, whether cryptographic or not.

The embodiment of FIG. 8 largely corresponds to that of FIG. 7. Supplementing FIG. 7, each step $S_i$, with the exception of the last step $S_n$, includes a combinatory operation $HC_i$ which combines the right-hand data $RD'_i$ with a tertiary auxiliary value $W_i$. The tertiary auxiliary value $W_i$ preferably equals the XOR combination of the auxiliary values $A_0$ and $A_i$:

$$W = A_0 \oplus A_1,$$

where $A_0 \neq A_1$.

This results in the operation $HC_i$ always adding the zeroth auxiliary value $A_0$ and compensating the first auxiliary value $A_1$. As a result, it is possible that all cryptographic operations $F_i$ are essentially identical, which requires a much smaller processing and/or storage capacity from a processor system with which the method is carried out. In the embodiment of FIG. 8, the operations $F''_i$ are such adjustments of the original operations $F_i$, that these are corrected for the auxiliary value $A_1$ and in addition combine the tertiary auxiliary value $W = A_0 \oplus \ldots A_1$ with their result. In other words, if $RD_i \oplus A_1$ is fed to $F''_i$, the result will be equal to:

$$FD'_i = F_1(RD_1) \oplus W.$$

It will be understood by those skilled in the art that the combinatory processes $AC_i$, $BC_i$ and $HC_i$ may be carried out in different locations in the cryptographic process P to achieve a comparable or even identical effect.

Figure 9:
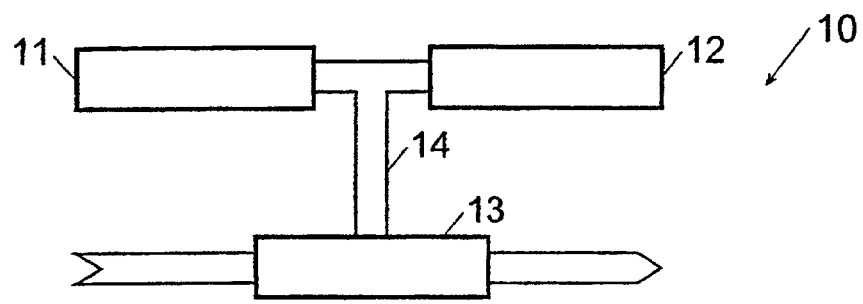
FIG. 9 schematically shows a circuit in which the invention is applied.

FIG. 9 schematically shows a circuit 10 for implementing the method according to the invention. The circuit 10 comprises a first memory 11, a second memory 12 and a processor 13, the memories 11 and 12 and the processor 13 being coupled using a data bus 14. By providing two memories, it is possible each time to carry out a substep of one of the processes P and P* (see FIG. 4), to store the result of said substep in, e.g., the first memory 11, and from the second memory 12 to transfer a previous interim result from the other process to the processor 13. In this manner, it is possible to efficiently carry out the alternating computation of substeps of two different processes.

Figure 10:
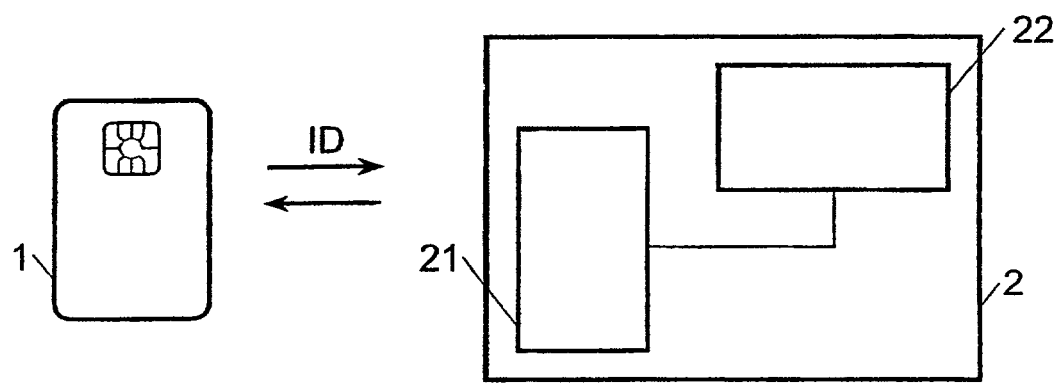
FIG. 10 schematically shows a payment system in which the invention is applied.

The payment system schematically shown in FIG. 10 comprises an electronic payment means 1 and a payment station 2. The electronic payment means 1 is, e.g., a so-called smart card, i.e., a card provided with an integrated circuit for storing and processing payment data. The payment station 2 comprises a card reader 21 and a processor circuit 22. The processor circuit 22 may correspond to the circuit 10 of FIG. 9.

At the beginning of a transaction, the payment means 1 transmits an identification (card identification) ID to the payment station 2. By reference to said identification, the payment station 2 determines a key which will be used for said transaction. Said identification ID may be fed as input data X (see the FIGS. 1–3) to a cryptographic process which, on the basis of a master key MK (not shown), produces an identification-dependent transaction key $K_{ID}$ as output data Y. In accordance with the invention, for this purpose the process shown in the figures FIGS. 2 and 3 is used, the master key MK having been converted in advance, using a process R, into a supplementary master key MK*. Said supplementary master key MK* is now fed, preferably together with the identification ID, in accordance with FIG. 3, to the supplementary process P* in order to reproduce the original master key MK and to derive the transaction key $K_{ID}$ from the identification ID.

Although, in the figures FIGS. 2 and 3, there is always shown one single supplementary process P*, there may possibly be used several processes P*, P, P*, . . . in series and/or in parallel to derive the primary key K.

It will be understood by those skilled in the art that many modifications and amendments are possible without departing from the scope of the invention.

The invention claimed is:

1. A method for cryptographically processing data, comprising the steps of:
   a) feeding, to a cryptographic process (P), values of data (X) and a key (K);
   b) performing the cryptographically process (P) to yield cryptographically processed output data (Y);
   C) feeding, to the process (P), auxiliary values that mask the data (X) used in the process (P); and
   d) compensating, by an auxiliary process, influence of the auxiliary values on the output data (Y) such that the output data (Y) remains unaffected regardless of whether the data (X) is masked through use of the auxiliary values or not.

2. The method recited in claim 1 wherein the cryptographic process (P) comprises a number of steps ($S_i$), each of said steps ($S_i$) having a cryptographic operation for processing right-hand data ($RD_i$) derived from the data (X), so as to yield processed right-hand data ($FD_i$), and a combinatory operation ($CC_i$) for combining with left-hand data ($LD_i$), also derived from the data (X), and the processed right-hand data ($FD_i$) in order to form modified left data ($SD_i'$), and wherein right-hand data ($RD_1$) is combined with a primary auxiliary value ($A_1$) prior to a first one of the steps ($S_1$) and left-hand data ($LD_1$) is combined with an additional auxiliary value ($A_0$).

3. The method recited in claim 2 wherein immediately after a last one of the steps ($S_n$), right-hand data ($RD_n$) is combined with a further primary auxiliary value ($A_n$) and modified left-hand data ($SD_n'$) is combined with a further additional auxiliary value ($A_{n+1}$).

4. The method recited in claim 2 wherein the right-hand data ($RD_i$) is combined, in each one of the steps ($S_i$) and prior to a cryptographic operation ($F_i$), with a primary auxiliary value ($A_i$) of said one step ($S_i$).

5. The method recited in claim 2 wherein the processed right-hand data ($FD_i$) is combined, following a cryptographic operation ($F_i$), with a secondary auxiliary value ($B_i$) of said one step ($S_i$).

6. The method recited in claim 5 wherein the secondary auxiliary value ($B_i$) of one of the steps ($S_i$) is formed from a combination of a primary auxiliary value ($A_{i-1}$) of a preceding one of the steps and a primary auxiliary value ($A_{i+1}$) of a next one of the steps.

7. The method recited in claim 2 wherein all primary auxiliary values ($A_i$) are equal.

8. The method recited in claim 3 wherein the primary auxiliary values ($A_i$) or secondary auxiliary values ($B_i$) have been previously combined each time with a respective cryptographic operation ($F_i'$).

9. The method recited in claim 8 wherein a combined cryptographic operation ($F_i'$) contains a plurality of tables; and the tables are determined in a different order each time the cryptographic process (P) is performed.

10. The method recited in claim 8 wherein a combined cryptographic operation ($F_i'$) contains a plurality of tables; and the elements of the tables are determined or stored in a different order each time the cryptographic process (P) is performed.

11. The method recited in claim 10 wherein the order is stored as a lookup table.

12. The method recited in claim 2 wherein the right-hand data ($RD_i$) is combined with a tertiary auxiliary value ($W_i$) after each one of the steps ($S_i$).

13. The method recited in claim 12 wherein the tertiary auxiliary value ($W_i$) in all steps, except the last one of said steps ($S_n$), equals a combination of the primary auxiliary value ($A_1$) of the first one of the steps ($S_1$) and the additional auxiliary value ($A_0$); and in the last one of the steps ($S_n$) the tertiary auxiliary value equals zero.

14. The method recited in claim 2 wherein combining is performed through an exclusive-OR (XOR) operation.

15. The method recited in claim 1 wherein the data (X) comprises identification data of a payment device; and the processed data (Y) forms a diversified key.

16. The method recited in claim 1 wherein the cryptographic process (P) comprises a DES process.

17. The method recited in claim 16, wherein the DES process comprises triple DES.

18. A circuit for performing the method recited in claim 1.

19. A payment card having the circuit recited in claim 18.

20. A payment terminal having the circuit recited in claim 18.

21. A method for cryptographically processing data, comprising the steps of:
   a) feeding, to a cryptographic process (P), values of data (X) and a key (K);
   b) performing the cryptographic process (P) to yield cryptographically processed output data (Y);

c) feeding, to an invertible supplementary process (P*), a supplementary key (K*) in order to form the key (K); and d) wherein:
- the supplementary key (K*) masks the key (K) used in the process (P);
- the supplementary process (P*) comprises a cryptographic process to which an auxiliary key (K') is fed; and
- the supplementary key (K*) is obtained from a process that is inverse to the supplementary process (P*) and based on the key (K) and the auxiliary key (K').

22. The method recited in claim 21 wherein the data (X) comprises identification data of a payment device; and the processed data (Y) forms a diversified key.

23. The method recited in claim 21 wherein the cryptographic process (P) comprises a DES process.

24. The method recited in claim 23 wherein the DES process comprises triple DES.

25. A circuit for performing the method recited in claim 21.

26. A payment card having the circuit recited in claim 25.

27. A payment terminal having the circuit recited in claim 25.

28. A method for cryptographically processing data, comprising the steps of:

a) feeding, to a cryptographic process (P), values of data (X) and a key (K);

b) performing the cryptographic process (P) in order to form cryptographically processed output data (Y);

c) feeding, to an supplementary process (P*), a supplementary key (K*) in order to form the key (K);

d) wherein:
- the supplementary key (K*) masks the key (K) used in the process (P);
- the supplementary process (P*) comprises a cryptographic process to which an auxiliary key (K') is fed;
- the data (X) is also fed to the supplementary process (P*); and
- the supplementary process (P*) is performed only if the data (X) has predetermined properties.

29. The method recited in claim 28 wherein the data (X) comprises identification data of a payment device; and the processed data (Y) forms a diversified key.

30. The method recited in claim 28 wherein the cryptographic process (P) comprises a DES process.

31. The method recited in claim 30 wherein the DES process comprises triple DES.

32. A circuit for performing the method recited in claim 28.

33. A payment card having the circuit recited in claim 32.

34. A payment terminal having the circuit recited in claim 32.

* * * * *